March 21, 1933. E. G. McDONALD 1,902,569
OPERATING DEVICE
Filed July 12, 1929
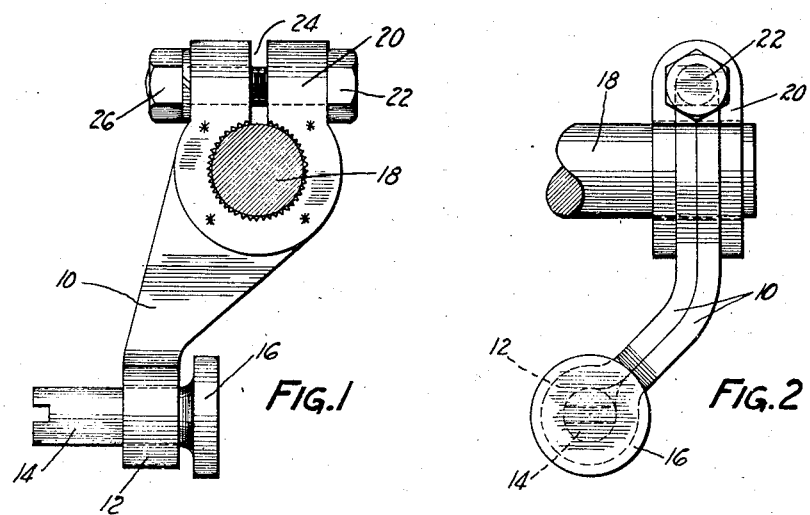
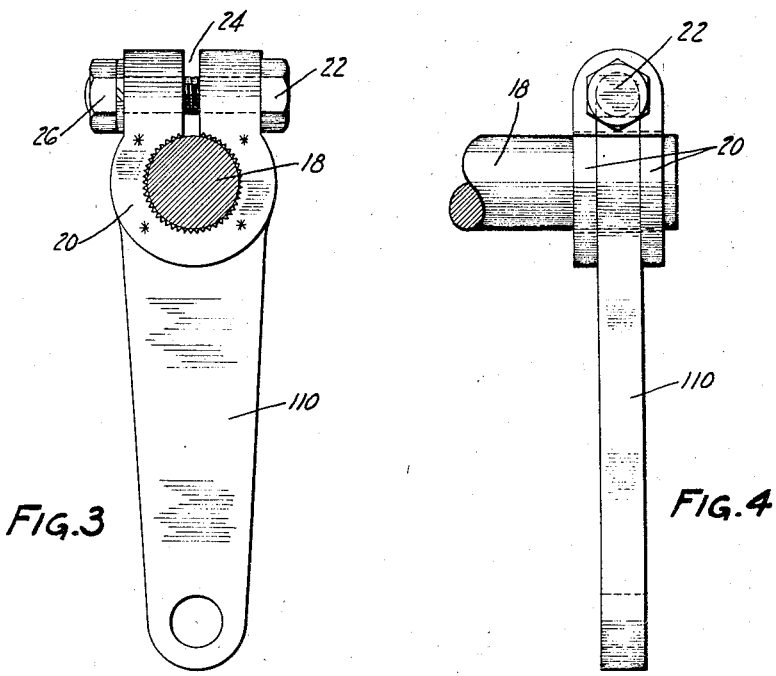
INVENTOR.
EUGENE G. McDONALD
BY
ATTORNEY Patented Mar. 21, 1933

1,902,569

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

OPERATING DEVICE

Application filed July 12, 1929. Serial No. 377,673.

This invention relates to levers and equivalent operating devices for brakes or the like, and is illustrated as embodied in a novel lever formed to be adjustably mounted on a shaft, for example on the cam-shaft of a brake.

One feature of the invention relates to providing the lever, usually at one end, with simple and inexpensive means for adjustably mounting and clamping it on a shaft. For example, the lever may have a shaft-embracing opening, and preferably is slotted so that the opening may be contracted tightly about the shaft. In order to provide means for contracting the opening in this manner, by means of a clamping bolt or the like, I prefer to provide a U-shaped stamping or other member cooperating with the edge of the lever to encircle the bolt, and which embraces the end of the lever. The sides of this member may be formed with openings alined with the opening in the lever, these sides being welded or otherwise secured to the sides of the lever, and they may also be slotted if desired so that the clamping bolt contracts all of the openings about the shaft.

Another feature of the invention relates to forming the lever of a strip of metal doubled to form at one end a loop receiving an adjustable thrust member, which may be threaded therethrough.

The above and other objects and features of the invention, including various novel and desirable details of construction, will be apparent from the following description of the illustrative embodiments shown in the accompanying drawing, in which:

Figure 1 is a side elevation of one form of lever, showing the end of the shaft on which it is mounted;

Figure 2 is a front elevation of the parts shown in Figure 1; and

Figures 3 and 4 are respectively side and front elevations showing another form of lever suitable for operating a rear brake, the form in Figures 1 and 2 being intended for use on a front brake.

In the arrangement of Figures 1 and 2, the lever or equivalent operating device comprises a strip of steel 10, doubled on itself to form at its lower end a loop 12, which may be threaded internally adjustably to receive a thrust member 14, which is shown with a head 16 adapted for engagement with a ball at the end of the usual operating lever fulcrumed on the front axle. The doubled parts of the metal strip 10 are spot-welded or otherwise permanently secured together, to form a double-thickness lever, the sides of which are formed with alined serrated openings embracing a shaft such as the brake camshaft 18.

The upper end of the lever is shown embraced between and spot-welded or otherwise secured to the sides of a U-shaped stamped member 20, which cooperates with the upper edge of the lever to encircle and form a passageway for a member such as a clamping bolt 22. The sides of the member 20 are preferably formed with serrated shaft-embracing openings alined with the opening in the lever itself. The lever and the member 20 are formed with registering slots 24, to provide for the contraction of the openings about the shaft when a nut 26 on the clamping bolt 22 is tightened.

The lever shown in Figures 3 and 4 differs from the one described above only in that it is a straight single-thickness stamping 110 with an opening at its lower end to receive the pin of the usual clevis on a brake rod.

While two illustrative embodiments have been described in detail, it is not my intention to limit the scope of the invention to those particular embodiments, or otherwise than by the terms of the appended claims.

I claim:

1. An operating device having a shaft-encircling opening with a slot communicating therewith so that the opening may be contracted about a shaft, and a generally U-shaped member with its sides secured to the opposite sides of the device and with its center arranged to cooperate with the edge of said device to embrace a clamping member arranged to contract said opening as described.

2. An operating device having a shaft-encircling opening with a slot communicating therewith so that the opening may be contracted about a shaft, and a generally U-shaped member with its sides secured to the opposite sides of the device and with its center arranged to cooperate with the edge of said device to embrace a clamping member arranged to contract said opening as described, said U-shaped member having its center with a slot in registry with the slot of the operating device and having its sides formed with shaft-embracing openings communicating with said slot and coaxial with respect to the opening in the operating device.

3. An operating device having a shaft-encircling opening with a slot communicating therewith so that the opening may be contracted about a shaft, and a generally U-shaped member with its sides secured to the opposite sides of the device and with its center arranged to cooperate with the edge of said device to embrace a clamping member arranged to contract said opening as described, said U-shaped member having its center with a slot in registry with the slot of the operating device.

4. An operating device having a shaft-enciruling opening with a slot communicating therewith so that the opening may be contracted about a shaft, and a one-piece stamped generally U-shaped member with its sides welded to the opposite sides of the device and with its center arranged to cooperate with the edge of said device to embrace a clamping member arranged to contract said opening as described.

5. An operating device comprising a lever having an opening adjacent one edge and having a slot communicating with said opening in combination with a U-shaped member cooperating with said edge to form a passageway for a clamping member and having its sides embracing said lever between them and secured to opposite sides of said lever.

6. An operating device comprising a lever having an opening adjacent one edge and having a slot communicating with said opening in combination with a U-shaped member cooperating with said edge to form a passageway for a clamping member and having its sides embracing said lever between them and secured to opposite sides of said lever, said U-shaped member having openings in its sides coaxial with respect to the opening in the lever.

7. An operating device comprising a lever having an opening adjacent one edge and having a slot communicating with said opening in combination with a U-shaped member cooperating with said edge to form a passageway for a clamping member and having its sides embracing said lever between them and secured to opposite sides of said lever, said U-shaped member being slotted to be contracted by the clamping member jointly with the slotted part of the lever.

8. An operating device comprising a lever having an opening adjacent one edge and having a slot communicating with said opening in combination with a U-shaped member cooperating with said edge to form a passageway for a clamping member and having its sides embracing said lever between them and secured to opposite sides of said lever, said U-shaped member having openings in its sides coaxial with respect to the opening in the lever, and being slotted to be contracted by the clamping member jointly with the slotted part of the lever.

9. An operating device comprising a doubled strip of metal looped at one end to form a passage for a thrust member and which passage is internally threaded adjustably to receive said member, and which has at its opposite end alined transverse shaft-embracing openings, in combination with means for contracting said openings about a shaft.

10. An operating device comprising a doubled strip of metal looped at one end to form a passage for a thrust member, and which has at its opposite end alined transverse shaft-embracing openings, in combination with a U-shaped member embracing said opposite end between its sides and which cooperates with said end to form a passageway for a clamping member.

11. An operating device comprising a doubled strip of metal looped at one end to form a passage for a thrust member, and which has at its opposite end alined transverse shaft-embracing openings, in combination with a U-shaped member embracing said opposite end between its sides and which cooperates with said end to form a passageway for a clamping member, said end and the U-shaped member being jointly slotted to be contractable about a shaft.

12. An operating device comprising a double strip of metal looped at one end to form a passage for a thrust member, and which has at its opposite end alined transverse shaft-embracing opening, in combination with a U-shaped member embracing said opposite end between its sides and which cooperates with said end to form a passageway for a clamping member, the sides of the U-shaped member being formed with shaft-embracing openings in alinement with the first opening.

13. An operating device comprising a double strip of metal looped at one end to form a passage for a thrust member, and which has at its opposite end alined transverse shaft-embracing openings, in combination with a U-shaped member embracing said opposite end between its sides and which cooperates with said end to form a passageway for a clamping member, the sides of the U- shaped member being formed with shaft-embracing openings in alinement with the first opening, the U-shaped member and said device having slots communicating with said openings, to facilitate contracting the openings about a shaft.

14. An operating device comprising a doubled strip of metal having at one end alined transverse shaft-embracing openings, in combination with a U-shaped member embracing said end between its sides, and which cooperates with said end to form a passageway for a clamping member, the sides of the U-shaped member being formed with shaft-embracing openings in alignment with the first named openings, the U-shaped member and said device having slots communicating with said openings, to facilitate contracting the openings about a shaft.
In testimony whereof, I have hereunto signed my name.

EUGENE G. McDONALD.